(12) United States Patent
Grosbois et al.

(10) Patent No.: US 9,108,331 B2
(45) Date of Patent: Aug. 18, 2015

(54) CUTTING OF PREFORMS PRIOR TO RTM INJECTION BY MEANS OF A WATER JET AND CRYONICS

(75) Inventors: Christophe Grosbois, Combs la Villa (FR); Damien Hebuterne, Breuillet (FR)

(73) Assignee: SNECMA, Paris (FR)

( * ) Notice: Subject to any disclaimer, the term of this patent is extended or adjusted under 35 U.S.C. 154(b) by 198 days.

(21) Appl. No.: 13/577,289

(22) PCT Filed: Feb. 10, 2011

(86) PCT No.: PCT/FR2011/050283
§ 371 (c)(1),
(2), (4) Date: Aug. 6, 2012

(87) PCT Pub. No.: WO2011/098734
PCT Pub. Date: Aug. 18, 2011

(65) Prior Publication Data
US 2012/0297943 A1    Nov. 29, 2012

(30) Foreign Application Priority Data

Feb. 10, 2010  (FR) ..................... 10 50944

(51) Int. Cl.
*B26D 7/08* (2006.01)
*B26D 7/10* (2006.01)
*B26F 3/00* (2006.01)

(52) U.S. Cl.
CPC . *B26D 7/10* (2013.01); *B26F 3/004* (2013.01); *B26F 3/008* (2013.01); *B26F 3/00* (2013.01); *B26F 2003/006* (2013.01); *Y10T 83/041* (2015.04); *Y10T 83/283* (2015.04)

(58) Field of Classification Search
CPC .... B26F 3/004; B26F 3/008; B26F 2003/006; B26F 3/00; Y10T 83/041
USPC ........ 425/292, 295, 298, 300, 235, 281, 72.1, 425/404, 446; 83/15
See application file for complete search history.

(56) References Cited

U.S. PATENT DOCUMENTS

| | | | | | |
|---|---|---|---|---|---|
| 2,985,050 | A | * | 5/1961 | Schwacha | 83/53 |
| 3,175,383 | A | * | 3/1965 | Levine | 29/599 |
| 3,526,162 | A | * | 9/1970 | Willcox | 83/16 |
| 3,532,014 | A | * | 10/1970 | Franz | 83/53 |

(Continued)

FOREIGN PATENT DOCUMENTS

| | | | | |
|---|---|---|---|---|
| DE | 33 46 978 | | 7/1984 | |
| DE | 10051942 | A1 * | 5/2002 | B26F 3/00 |

(Continued)

OTHER PUBLICATIONS

International Search Report issued on Jun. 15, 2011 in PCT/FR11/050283 filed on Feb. 10, 2011.

*Primary Examiner* — Seyed Masoud Malekzadeh
(74) *Attorney, Agent, or Firm* — Oblon, McClelland, Maier & Neustadt, L.L.P.

(57) ABSTRACT

A device for cutting a fibrous preform, for production of a part made of a composite material by injection of resin under vacuum. The device includes a die for receiving the preform, on which a template of outer edges of the part is referenced, a mechanism cutting outer edges of the preform according to the template, and a mechanism for cooling the preform that is suitable for solidifying a liquid forming a substrate for the preform.

6 Claims, 1 Drawing Sheet

(56) References Cited

U.S. PATENT DOCUMENTS

| | | | |
|---|---|---|---|
| 3,730,040 A * | 5/1973 | Chadwick et al. | 83/177 |
| 4,081,892 A * | 4/1978 | Mercer | 29/421.1 |
| 4,092,889 A * | 6/1978 | Fisher | 83/177 |
| 4,827,679 A * | 5/1989 | Earle, III | 451/40 |
| 4,900,379 A * | 2/1990 | Chapman | 156/64 |
| 5,068,513 A * | 11/1991 | Gangemi | 219/121.67 |
| 5,097,731 A * | 3/1992 | Vives et al. | 83/53 |
| 5,111,984 A * | 5/1992 | Niedbala | 225/1 |
| 5,222,332 A * | 6/1993 | Mains, Jr. | 451/39 |
| 5,282,310 A * | 2/1994 | Rommelmann et al. | 29/825 |
| 5,341,608 A * | 8/1994 | Mains, Jr. | 451/39 |
| 5,399,424 A * | 3/1995 | Rommelmann et al. | 428/299.1 |
| 5,599,223 A * | 2/1997 | Mains, Jr. | 451/39 |
| 6,280,302 B1 * | 8/2001 | Hashish et al. | 451/102 |
| 6,720,518 B2 * | 4/2004 | Sanders et al. | 219/121.39 |
| 7,585,201 B2 * | 9/2009 | Kanai et al. | 451/2 |
| 7,692,440 B2 * | 4/2010 | Chew et al. | 324/757.03 |
| 7,857,686 B2 * | 12/2010 | Arnason | 452/161 |
| 2005/0032471 A1 * | 2/2005 | Pfarr et al. | 452/181 |
| 2005/0202764 A1 * | 9/2005 | Tateiwa et al. | 451/87 |
| 2006/0180579 A1 * | 8/2006 | Popescu et al. | 219/121.18 |
| 2007/0293132 A1 * | 12/2007 | Arnason | 452/140 |
| 2011/0156330 A1 * | 6/2011 | Gadd | 269/21 |
| 2014/0137713 A1 * | 5/2014 | Yoshida et al. | 83/15 |

FOREIGN PATENT DOCUMENTS

| | | |
|---|---|---|
| FR | 904 563 | 11/1945 |
| JP | 58 094943 | 6/1983 |
| WO | 2007 111574 | 10/2007 |
| WO | 2008 079098 | 7/2008 |

* cited by examiner

CUTTING OF PREFORMS PRIOR TO RTM INJECTION BY MEANS OF A WATER JET AND CRYONICS

BACKGROUND OF THE INVENTION

1. Field of the Invention

The field of the present invention is that of the fabrication of parts in composite materials, and in particular that of the production of parts by an in vacuo resin transfer molding (RTM) process.

2. Description of the Related Art

The RTM process is routinely used in the fabrication of aerospace parts. It consists in the fabrication of a fiber, preferably woven fiber, preform that is placed in a closed mould in which it receives, by injection at a low pressure, a thermosetting resin of relatively low viscosity. The main steps of the process are placing the fibrous preform in the mould, filling the mould by injection and polymerizing the resin. A vacuum is generally established in the mould to enable the resin to flow better and therefore to eliminate defects such as bubbles and voids.

This technique is used notably for the fabrication of compressor blades, and in particular fan blades, for aeronautical turbomachines. To this end, as indicated in the applicant's patent application EP1526285 a fiber structure is woven to produce a preform that will serve as a structural reinforcement for the part. Present performs are three-dimensional and increasingly complex. In particular, in the case of a fan blade, the preform has a great length compared to its other dimensions. The preform obtained is thus relatively flexible and is deformed by the action of its own weight.

Moreover, to fabricate a fan blade, a multitude of warp and weft threads are used which must thereafter be terminated once weaving is finished. When fabrication of the fan blade preform is finished, it is necessary to cut it to size and to cut all these threads, which are generally carbon threads, allowing an excess length to project from the preform. One example of a device suitable for this cutting operation is given in patent application WO 2007/111574. However, in the first place, this operation, effected with a cutting tool, is difficult to carry out because of the resistance to cutting of the carbon strands and because of the deformation of the performs. Secondly it is effected on a cutting frame from which the preform must thereafter be extracted to transfer it to the injection mould. With a preform that deforms, this manipulation is relatively difficult and causes uncertainties as to its position within the injection mould.

BRIEF SUMMARY OF THE INVENTION

An object of the present invention is to remedy these drawbacks by proposing a fabrication method, with the associated tooling, but does not have at least some of the drawbacks of the prior art and notably enables easy manipulation of a preform before positioning it in the injection mould.

To this end, the invention consists in a device for cutting a fibrous preform intended for the production of a part made of a composite material by injection of resin in a vacuum, said device including a die receiving said preform to which the template of the outer edges of said part is referenced and means for cutting said outer edges of said preform according to said template, characterized in that the device includes means for hardening said preform by cryogenic freezing.

Cryogenic freezing stiffens the fibers constituting the preform, notably if they are carbon fibers, which ensures hardening thereof and the possibility of manipulating it afterwards with ease.

Hardening is advantageously generated by solidifying a liquid forming a substrate for said preform.

Solidification of the substrate liquid ensures good retention of the preform during the cutting operation and guarantees that its outer edges are correctly positioned. It further facilitates handling of the preform, notably during its transfer from the cutting die to the injection mould.

The cooling means preferably consist in a cryogenic freezing system, the associated substrate liquid being water. This solution has the advantage of simplicity, water being already present in the preform because of the weaving process generally employed.

The cutting means advantageously consist in a system for cutting using a jet of liquid sprayed under pressure and the die advantageously includes a groove for recovery of said liquid.

In one particular embodiment the cutting means consist in a pressurized water jet cutting system.

The median curve of said groove preferably reproduces the template of the outer edges of said part.

In one particular embodiment the die comprises a lower part on which the preform is deposited and an upper part designed to cover said preform at least partially, said upper part also including means for hardening by cryogenic freezing.

The invention also relates to a method for cutting a fibrous preform for the production of a composite material part by injection of resin into an injection mould in a vacuum, including the steps of installing the preform on a die to which the template of the outer edges of said part is referenced and cutting the outer edges of said preform according to said template using cutting means, characterized in that it includes, before said cutting, a step of hardening said preform by cryogenic freezing.

The hardening step advantageously comprises a first sub-step of impregnating said preform with a liquid forming a substrate for said preform followed by a second sub-step of cooling said preform by cryogenic freezing until said substrate liquid solidifies.

The invention relates finally to a method of producing a composite material part by injection of resin into an injection mould in a vacuum including, prior to its installation in the injection mould, the production of a fibrous preform, the installation of said preform in a die to which the template of the outer edges of said part is referenced and cutting its outer edges by a method as described above.

The method advantageously includes a step of transferring the preform from the die to the injection mould, the substrate liquid being in a solid form.

In one particular embodiment the method further includes a step of compressing at least part of said preform against the die prior to solidification of the substrate liquid.

BRIEF DESCRIPTION OF THE SEVERAL VIEWS OF THE DRAWINGS

The invention will be better understood and other objects, details, features and advantages thereof will become more clearly apparent in the course of the following detailed explanatory description with reference to the appended diagrammatic drawing of one embodiment of the invention provided by way of purely illustrative and nonlimiting example.

In the drawing.

DETAILED DESCRIPTION OF THE INVENTION

Figure 1:
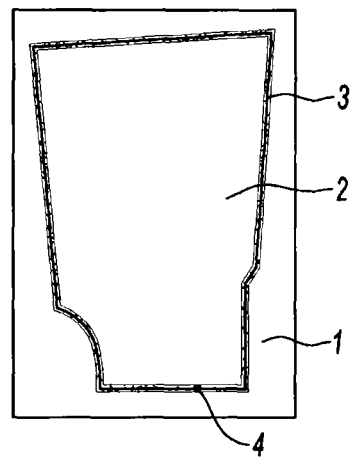
FIG. 1 is a plan view of a preform cutting die of one embodiment of the invention.

Referring to FIG. 1, there is seen a die 1 for the precise cutting of a preform 2 produced beforehand by 3D weaving of fibers, such as glass or carbon fibers. These fibers project from the preform and must be cut so that they do not project from the final shape to be imparted to the blade in production.

The die 1 therefore includes a peripheral groove 3, the median curve of which corresponds to the template of the blade to be produced and into which a cutting water jet 4 is directed.

Figure 2:
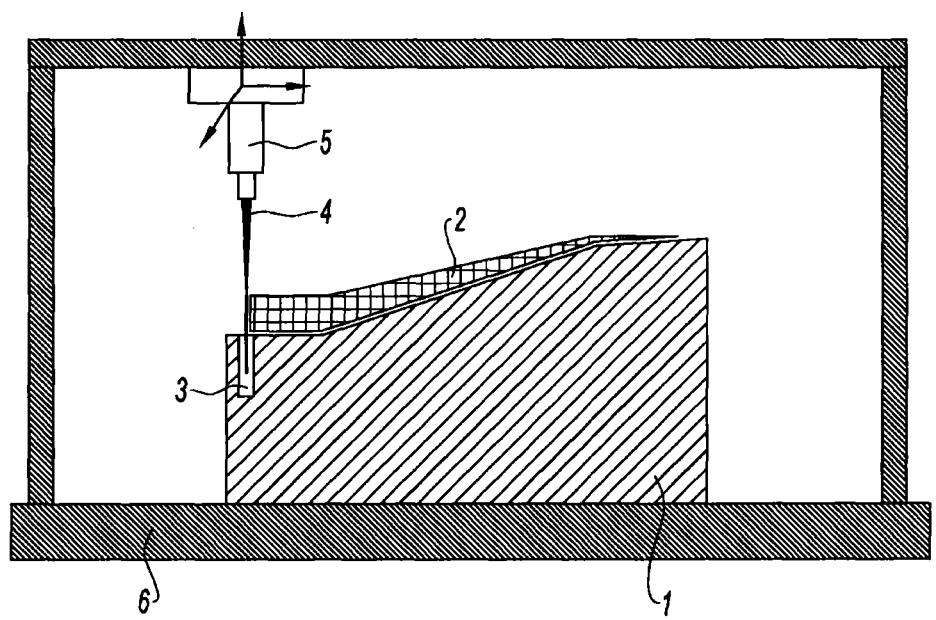
FIG. 2 is a front view in section of a preform cutting die of one embodiment of the invention.

Referring now to FIG. 2, there is seen the die 1, placed on a frame 6 and on which the preform 2 to be cut is placed. One of the lateral edges of the preform is positioned above the peripheral groove 3 and is being cut by a water jet 4 that is sprayed by a cutting machine provided with a mobile head 5. The mobile head 5 is adapted to be moved along three perpendicular axes so as, whilst remaining normal to the surface, to be able to follow the lateral template of the blade and to follow the path defined by the peripheral groove 3.

The invention consists in a system that, whilst cutting cleanly, quickly and precisely the 3D performs of fan blades to the dimensions of the RTM injection moulds, enables solidification of the preform during the time in which it is cut to size and during its transfer into the RTM injection mould.

In a known water jet cutting technique for the precise cutting of fibers consist the preform is installed in the cutting die 1.

To stiffen the preform before it is cut to length, the invention consists in associating a cryogenic system with the cutting die 1. Cryogenic freezing is an ultrafast freezing technology that is used commercially for other applications, remains flexible in use and is of relatively low cost. The cryogenic freezing system associated with the water jet cutting machine on the one hand enables temporary hardening and on the other hand precise retention of the fibrous preform in the die 1. The use of this technique is facilitated by the fact that the weaving of the fibers in the production of a composite material is generally effected in the presence of water, which is used as a lubricant. The presence of water in the preform after it is cut is thus a problem that has already been mastered.

The sequence of cutting operations may be summarized as follows:

The preform 2 leaves the weaving machine (not shown) with excess lengths of its warp and weft threads. While the fibers that emerge from the faces of the blade may be coarsely cut because the excess threads will be pressed against the surface of the blade and buried in the polymerized resin, the fibers that exit from the thin edges of the blade must on the other hand be cut to precise dimensions because they would project from the injection mould and cause burrs on the outer edges of the blades. Thus edge effects prejudicial to correct filling of the tooling when injecting the resin and deformation of the fibers that could cause localized lack of quality are limited.

The preform 2 is placed on the cutting matrix 1, which has a shape identical to the injection mould and the final geometry required for the polymerized part. A cryogenic system (not shown in FIG. 2) is integrated into the lower frame of the cutting machine 1.

The preform 2 may also be covered by an upper die (not shown) also having the final geometrical shape of the upper part of the blade and into which an upper part of the cryogenic freezing system is then inserted. This upper die also enables the preform to be twisted, adjusted and pressed onto the lower die 1.

When in position on the die 1, the preform 2 is impregnated with demineralized water and then frozen at −40° C. by the cryogenic freezing system. It thus becomes totally stiffened by the frozen water and moreover is attached to the die 1, to which it is stuck. The cutting operation can thus be conducted without risk of incorrect positioning of the preform.

Water jet cutting is effected like a trimming operation. The water jet, formed either of pure water or of water of which particular media have been added, cuts cleanly and precisely the excess lengths of the preform solidified by the frozen water, following the cutting template corresponding to the median curve of the peripheral groove 3. After it has passed through the excess lengths of the preform 2, the water is collected by the groove and then evacuated by pipes provided for this purpose.

Once cutting is finished, the freezing system is turned off to enable the preform 2 to be separated from the tooling. It remains frozen within its thickness, however, to preserve sufficient stiffness and so that it can be manipulated outside the die 1 and placed in the injection mould without becoming deformed. It is then dried, for example by means of an oven, in the injection mould where the fabrication cycle continues with the RTM injection process.

In an alternative embodiment the die 1 may be covered with a skin to facilitate extraction from the mould. For example, this skin may be constituted of a layer of silicone type, of polytetrafluoroethylene (PTFE, better known as Teflon®), or any other equivalent material.

The preform is then not thawed superficially as previously but simply unstuck from the die 1 and retained as such to be placed precisely in the injection mould, where it will be dried.

In a variant embodiment of the present invention, the cutting operation with stiffening by cryogenic freezing is combined with an operation of compacting the root, such as that described in the applicant's patent application FR 200904563. In that application the fibers are compacted in the injection mould by a pressure that is applied to the root of the preform, before injection of resin, with the aim of pressing the fibers against the preform. In the case of the present invention the stiffness imparted to the root during cryogenic freezing no longer allows this pressurization to be effected in the injection mould. The operation of compressing the root is then effected in the cutting die 1 and not in the injection mould. The techniques employed to compress the root in the injection mould can be applied, mutatis mutandis, in the cutting die 1.

The present invention has been described with a presence of water that is solidified during cryogenic freezing. Given the characteristics of carbon fibers, which are liable to be stiffened by the cryogenic freezing action, even in the absence of water or any other liquid that can be solidified, it is possible to address the technical problem of retaining the preform and facilitating its manipulation simply by cryogenic freezing of the preform.

The invention claimed is:

1. A device for cutting a fibrous preform intended for production of a part made of a composite material by injection of resin in a vacuum, the device comprising:

a die receiving the preform to which a template of outer edges of the part is referenced, the die, is placed on a frame, including a peripheral groove having a median curve corresponding to the template;

a liquid jet cutting apparatus which sprays a jet of liquid under pressure to cut outer edges of the preform according to the template; and a cryogenic freezing system which freezes an entire preform positioned on the die, the cryogenic freezing system being integrated into a lower frame of the liquid jet cutting apparatus, wherein the die comprises a lower part on which the preform is deposited and an upper part configured to cover the preform at least partially, wherein the upper part also includes a portion of the cryogenic freezing system.

2. The device as claimed in claim 1, wherein the cryogenic freezing system freezes a liquid forming a substrate for the preform.

3. The device as claimed in claim 2, wherein the liquid forming the substrate is water.

4. The device as claimed in claim 1, wherein the liquid jet cutting apparatus includes a pressurized water jet cutting system.

5. The device as claimed in claim 1, wherein the liquid jet cutting apparatus includes a mobile head which moves along three perpendicular axes so as to follow the template while remaining normal to a surface of the part.

6. The device as claimed in claim 1, wherein the part is a fan blade, and wherein dimensions of the template correspond to dimensions of an injection mold of the fan blade such that the preform is cut to a final geometry of the fan blade, and a portion of the template corresponds to a root of the fan blade.

* * * * *

UNITED STATES PATENT AND TRADEMARK OFFICE
CERTIFICATE OF CORRECTION

| | | |
|---|---|---|
| PATENT NO. | : 9,108,331 B2 | Page 1 of 1 |
| APPLICATION NO. | : 13/577289 | |
| DATED | : August 18, 2015 | |
| INVENTOR(S) | : Christophe Grosbois et al. | |

It is certified that error appears in the above-identified patent and that said Letters Patent is hereby corrected as shown below:

Title Page, Item (75) line 1, Inventors, change "Combs la Villa" to --Combs la Ville--.

Signed and Sealed this
Seventeenth Day of May, 2016

Michelle K. Lee
*Director of the United States Patent and Trademark Office*